United States Patent [19]

Stephens

[11] Patent Number: 4,584,872
[45] Date of Patent: Apr. 29, 1986

[54] TIRE MOUNTED CENTERING AND LEVELING DEPRESSOR FOR SUBMERSION TANKS

[76] Inventor: Carlton W. Stephens, 5803 Brandywine Ct., Camarillo, Calif. 93010

[21] Appl. No.: 722,116

[22] Filed: Apr. 11, 1985

[51] Int. Cl.⁴ ............................................. G01M 3/06
[52] U.S. Cl. ....................................................... 73/45.6
[58] Field of Search .................................... 73/45.6, 49

[56] References Cited

U.S. PATENT DOCUMENTS 1,873,148  8/1932  Pedranti ................................ 73/45.6
1,880,328 10/1932  Miller ................................... 73/45.6
1,880,329 10/1932  Miller ................................... 73/45.6

FOREIGN PATENT DOCUMENTS 1005239 12/1951  France .................................. 73/45.6
 787955 12/1957  United Kingdom ................. 73/45.6

Primary Examiner—Stewart J. Levy
Assistant Examiner—Joseph W. Roskos
Attorney, Agent, or Firm—William H. Maxwell

[57] ABSTRACT

A leak testing tank for mounted vehicle wheel and tire assemblies, wherein a manually operable lever and depressor for submersion of the wheel and tire in a quieted condition inherently centers and levels the wheel and tire through its direct releasible engagement therewith.

14 Claims, 5 Drawing Figures

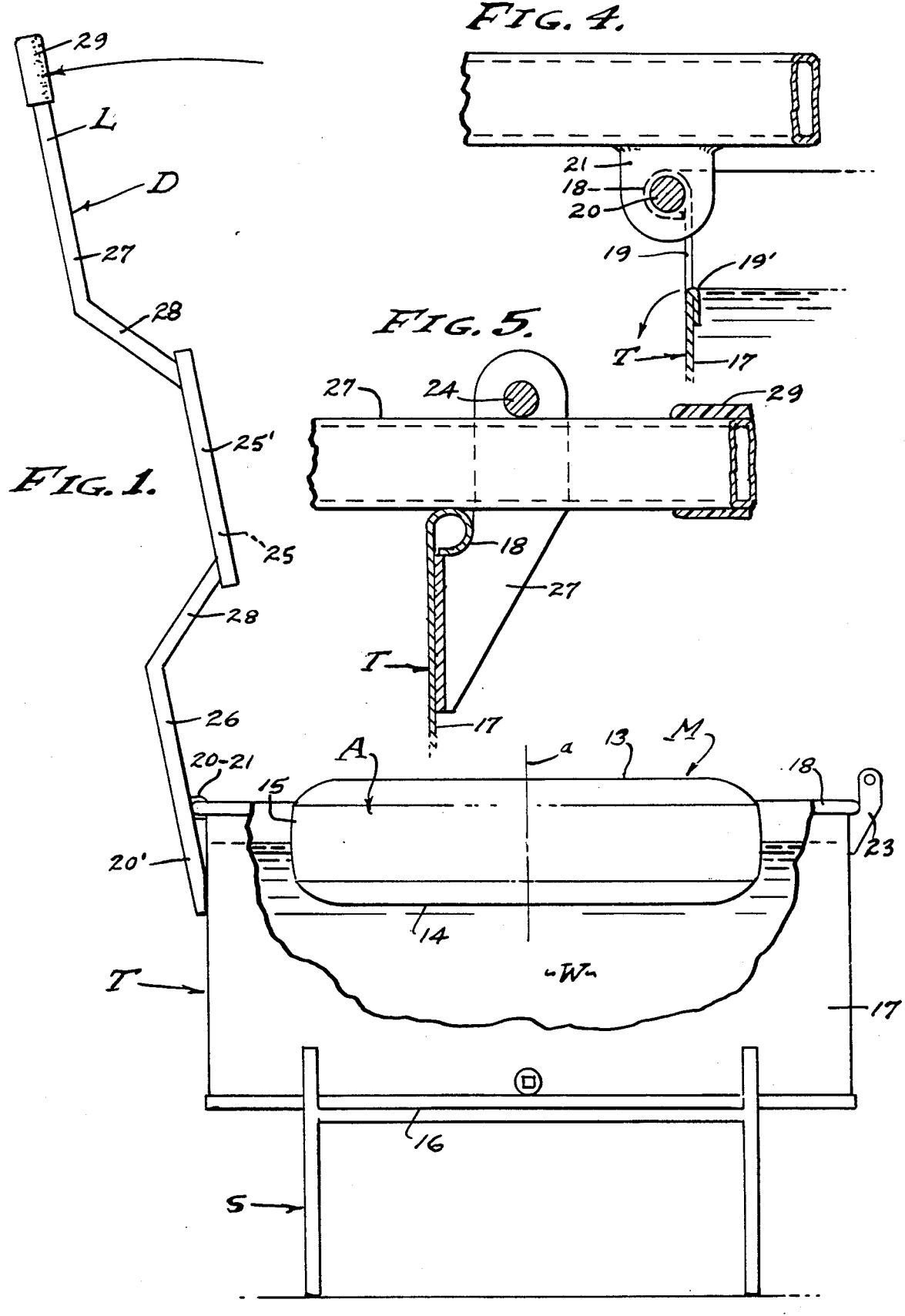

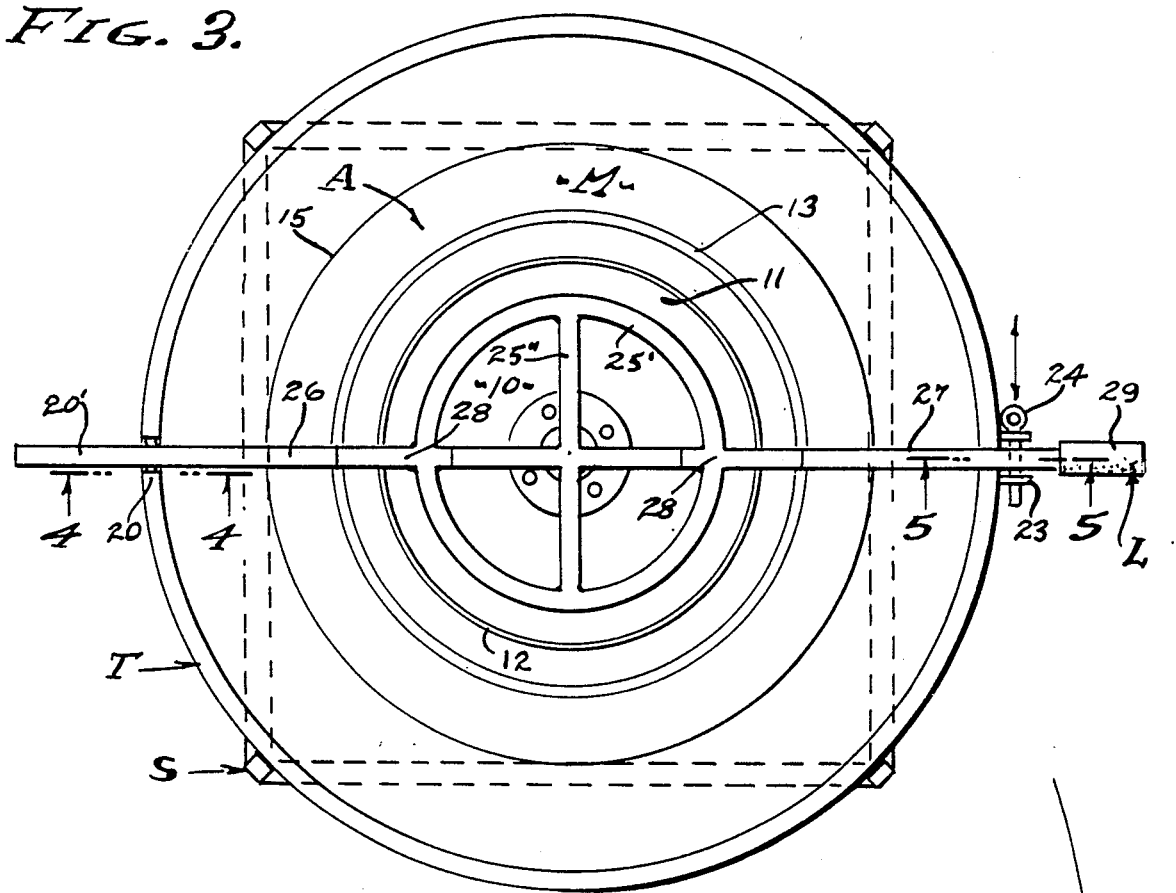
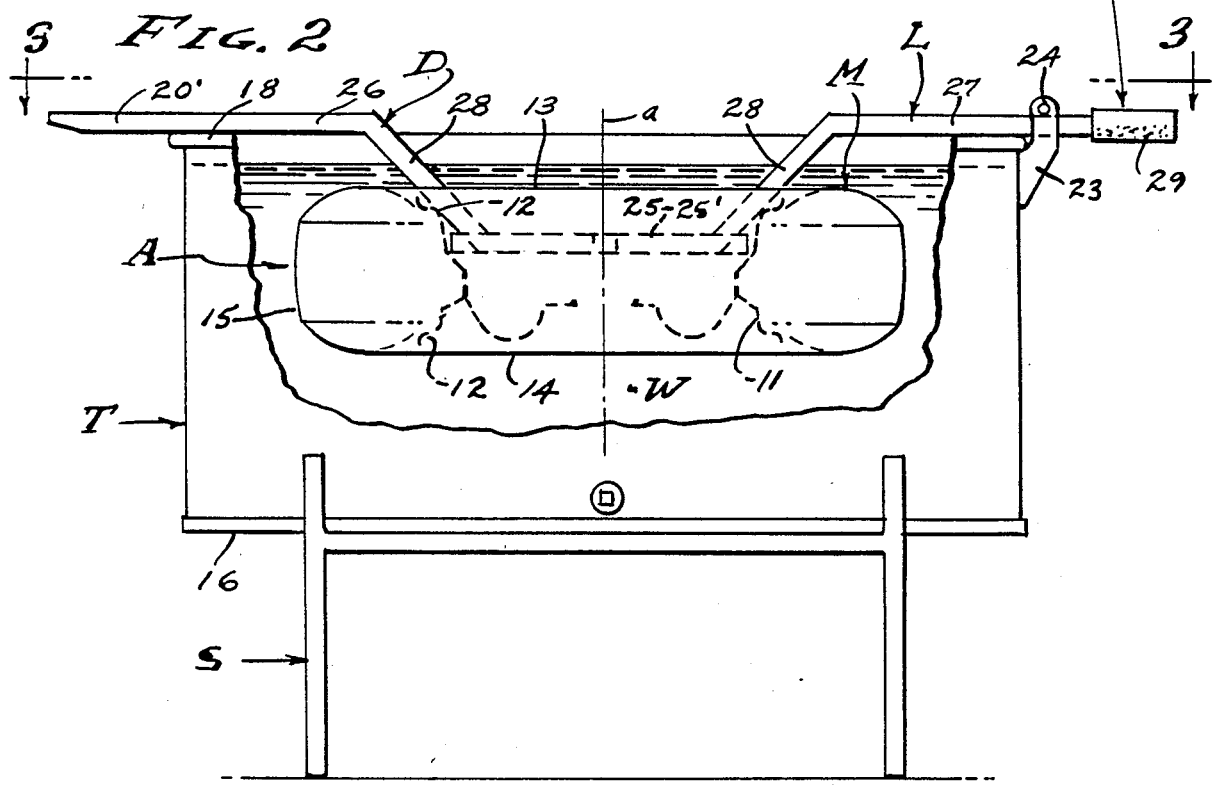

TIRE MOUNTED CENTERING AND LEVELING DEPRESSOR FOR SUBMERSION TANKS

BACKGROUND OF THE INVENTION

This invention relates to submersion tanks used to test mounted vehicle tires for leaks, and is particulalry concerned with complete depression of wheel and tire assemblies below a water level in the tank. Heretofore, difficulty has been experienced in the submersion of mounted tires, in that they are bouyant and resist depression, with the result that equilibrium or a level attitude thereof is difficult and not easily obtained. That is, the mounted tire will bob and unexpectedly rise at unpredictable points around its periphery, and all of which causes a stirring action in the water that is adverse to a calm condition required for leak detection. In other words, it has been difficult to depress and to completely submerge a mounted wheel and tire in a quieted condition. Accordingly, it is a general object of this invention to provide a leveling depressor for completely submerging mounted wheel and tire assemblies in a quieted level condition.

It is passenger vehicle wheels and tires with which this invention is primarily concerned, in which case the present day range of wheel size enables the leveling depressor to automatically depress any normal wheel assembly into a level condition below water level. It is an object of this invention that the level condition be inherent when the bouyant wheel assembly is depressed, subsequent manipulation being unecessary following a simplified manual insertion and centering effect that results from a lever function. A feature is the self adjusting engagement of the depressor and wheel that inherently centers and levels the bouyant assembly for quieted observation beneath the water surface.

It is an object of this invention to provide a simple and practical inspection tank for the submersion of mounted wheels, whereby the tire to be tested for leaks can be placed therein and releasably depressed and held submerged in a quieted condition as quickly as possible, with the assurance that it is level and completely submerged in each instance, and all of which is due to the inherent centering and leveling action of the depressor configuration as it is related to the conventional auto wheel and tire of normal size range.

SUMMARY OF THE INVENTION

This invention resides in the subjection of mounted wheels and tires to a state of quieted equilibrium when submerged in a test tank, for the detection of air leaks from the tire under working pressure. Detrimental leaks can be of any magnitude, and quietness in a stable and completely submerged condition is quite necessary for successful leak detection. That is, recurrent correction of unstable conditions cannot be tolerated, as this is a waste of time resulting in unquieted conditions that are not conducive to reliable leak detection; especially hard to find small leaks. It is to these ends of detecting any and all leaks that deftness and direct infalability is required without failures, and in the least amount of time. Accordingly, the wheel depressor as it is disclosed herein is a lever means with features engageable with a range of wheel sizes which inherenly centers and levels any such mounted wheel and tire in a quieted condition of equilibrium, on each and every occasion. No special attention is ever required of the operating person, whoes only requirement is the manual insertion and securment, followed by subsequent release and removal of the mounted tire after testing.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a side elevation of a submersion tank embodying the present invention, with a portion broken away to show the flotation of a mounted wheel and tire therein, and to show the depressor retracted so as to permit insertion and withdrawal of the mounted wheel and tire.

FIG. 2 is a view similar to FIG. 1, showing the depressor operated to depress the mounted wheel and tire in a leveled and submerged condition.

FIG. 3 is a plan view taken as indicated by line 3—3 on FIG. 2.

FIG. 4 is an enlarged detailed fragmentary view taken as indicated by line 4—4 on FIG. 3; and FIG. 5 is an enlarged detailed fragmentary view taken as indicated by line 5—5 on FIG. 3.

PREFERRED EMBODIMENT

Referring now to the drawings, this invention is shown generally as a tank T supported upon a stand S for carrying a body of water W of a sufficient depth for the complete submersion of a wheel and tire assembly or wheel mount M, and which is characterized by a depressor means D that releasably engages the wheel mount M to submerge it from a floating condition in the tank. It is to be understood that the wheel mount M is buoyant, as it is inflated with air, the tire being voluminous so as to establish substantial buoyancy. As shown, there is a wheel disc 10 disposed around a wheel axis a, and to which there is attached a rim 11 concentric with said axis. The rim is imperforate with inner and outer side flanges 12 that receive and seal with the bead of the tire casing and which secures the wheel and tire assembly when the tire is inflated and under internal pressure. An inner-tube (not shown) may or may not be employed, the purpose here being to submerge the entire wheel mount M so as to test it for air tightness. Obviously, any leakage will be detected as bubbles streaming from the leak or leaks, it being imperative to maintain a quieted condition during the testing observation.

The wheel mount M as it is shown herein involves inner and outer side walls 13 and 14 of a tire A joined by a peripheral tread 15 with beads at the inner diameter of the side walls to anchor into the flanges 12 of the wheel rim 11. As shown in FIG. 1 the wheel mount M is placed, manually, into the tank T where it initially floats, more or less centered within the tank and displaces water according to its weight. As shown in FIG. 2 the wheel mount M is depressed, through manual operation of the depressor means D, into a submerged condition where it displaces water according to its volume. As shown, the volume displacement is substantially greater than and perhaps about twice that of the displacement by weight.

The tank T can vary in its construction, and it is essentially an open tub having a bottom 16 and upstanding sides 17, preferably round (see FIG. 3) since the wheel mount M is a round assembly of concentrically related parts and members that will inherently seek a level condition when floating as shown in FIG. 1. The bottom 16 and sides 17 are imperforate with a drain plug as is indicated, and characterized by an open top for access. The sides 17 rise to a horizontal lip 18 of rolled cross section or the like, as shown. The side is notched at 19 to receive the depressor means D and so as to establish a level to which the water will rise in the tank (see FIG. 4). Excess water will pour over a lip 19' of notch 19 when a tire mount M of maximum size is submerged.

In accordance with this invention, the depressor means D is provided in order to automatically submerge a wheel mount M in a level condition; that is in equilibrium centered with the tank T. The wheel disc 10 varies greatly in design configuration, as will the cross section of the rim 11. However, the range of automtive wheel diameters at the flange 12 is predictable between or within a range of 13 to 16 inches diameter, and this diameter is precisely concentric with the axis a and disposed in a plane exactly normal to the axis a. In carrying out this invention it is the flange 12 that is utilized to advantage, the wheel disc 10 being deepest from the inside, exposing the inner flange diameter.

Furthermore, the hub configuration adaptability of different wheels varies greatly, for example to receive different lug-nut patterns (not shown); all of which features are useless to the performance of this invention. Therefore, the depressor means D is provided to initially engage centrally with the tire side wall 13 or 14, or with or within the wheel rim 11 or the inner flange 12; firstly to balance the wheel mount M horizontally; secondly to center the wheel mount M with respect to its axis a; and thirdly to submerge the wheel mount M. These three functions occur simultaneously with the one manual operation of shifting a second class lever L, whereby manual power is applied at one end of the lever, the fulcrum is at the other end of the lever, and the resistance or work is applied intermediate the ends of the lever.

As shown throughout the drawings, the depressor means D is a single moveable member in the form of a second class lever L operable accross the top of the tank T, with a fulcrum 20 at one side of the tank and with the power and/or securment portion of the lever at the other side of the tank. The rolled lip 18 of tank T carries a fulcrum 20 in the form of a pin (see FIG. 4), the lever L having a depending ear 21 that turns on the fulcrum pin at the underside of the lever of square tube form. A bracket 23 diametrically opposite the fulcrum pin 20 is bifurcated to receive the active end of the lever therebetween, and has aligned openings to receive a removeable latch pin 24 (see FIG. 3) or the like. The opposite ends of the lever L that overly the opposite sides of the tank T are in straight alignment so as to lie horizontally in the plane of the top lip 18 when the the lever L is depressed as shown in FIGS. 2,4 and 5. As best shown in FIG. 1 of the drawings, there is an extension 20' at the fulcrum end of the lever L to stop against the side of the tank T when the lever is in the opened or released condition, to rest in an over-center position.

The simultaneous balancing and centering of the wheel mount M in a submerged and quieted condition is accomplished by downwardly offsetting an intermediate center section 25 of lever L from the fulcrum section 26 and aligned power section 27, and by joining these three sections by a pair of upwardly and outwardly divergent equalizing sections 28. The intermediate center section 25 is comprised of a ring 25' in the horizontal plane of the section 25 when the lever L is depressed as shown in FIG. 2. Accordingly, the section 25 acts as a diametrical spoke member of the ring, there being another transverse spoke member 25" to stabilize the ring 25' laterally. The intermediate center section 25 and its complementary ring 25' and related spoke member 25" act together to level and to depress the wheel mount M. The joinder of the equalizing sections 28 to the intermediate center section 25 and to rim 25' is within the flange diameter of the smallest wheel rim diameter 11 to be accomodated, and the joinder of the equalizing sections 28 to the fulcrum seciton 26 and power seciton 27 is outside of the largest rim diameter 11 to be accomodated; such a relationship being shown in the drawings. In practice, the divergent angle of the sections 28 is 90°, or substantially so.

The testing of a wheel mount M is as follows: Although the depressor means D lever L may be stored in a lowered position, it is raised as shown in FIG. 1 where it is stopped in an over-center condition; for access through the top of tank T. A wheel mount M to be tested for air leakage is manually placed in the tank T to float by displacement of its weight and inflated tire upon the water W in the tank. Any water in excess of that displaced by flotation or submersion of a wheel mount M will be discharged over the lip 19' of notch 19. With a wheel mount M more or less centered within the tank T, the lever L is lowered and depressed against the wheel mount M by the application of manual pressure applied at a grip 29 at the end of the power section 27. As the power section 27 is brought down to the rim 18 of the tank T there are the threefold automatic functions of balancing the wheel mount M, centering the wheel mount M, and submerging the wheel mount M in a quieted condition. (1) The function of balancing is the result of the ring 25' and the equalizing sections engaging the wheel rim flange 12 at the maximum diameter thereof which is inherently at diametrically opposite peripheral points of contact, in a line intersecting axis a, the pressure applied at said opposite points being equally applied by the flotation of the wheel mount M. Therefore, the wheel mount M inherently seeks a level condition. (2) The function of centering is also the result of the equalizing sections engaging the wheel rim flanges 12 at equally divergent angles of said diametrically opposite peripheral points of contact on a line inersecting axis a, the equal pressures applied at said diametrically opposite points coacting with the equal angles of engagement to center the wheel mount M when it is level. (3) The function of submerging is also the result of the equalizing sections engaging the wheel rim flanges 12 at said diametrically opposite peripheral points of divergent contact, with the wheel mount M balanced in a level and centered condition of equilibrium. The maximum and minimum diameter contact with wheel mount rim flanges within the aforesaid range of wheel sizes (13 to 16 inches) ensures submersion by means of the relationship of flange diameter to the joinder of the lever sections 25, 26, 27 and 28 as above described. The characteristic feature of operation in this invention is the single manual lever actuation having the multiple funtions as above stated, resulting in the simultaneous submersion of the wheel mounts M in a quieted condition of centred equilibrium.

Having described only the typical preferred form and application of my invention, I do not wish to be limited or restricted to the specific details herein set forth, but wish to reserve to myself any modifications or variations that may appear to those skilled in the art as set forth within the limits of the following Claims.

I claim:

1. A submersion tank for testing wheel mounted vehicle tires in a leveled, centered and quietly submerged condition, and including;
   an upwardly open tank having a bottom and sides to contain a level of water for accomodating a wheel mount floating therein.
   the wheel mount being comprised of a tire inflatably installed on a wheel rim having inner and outer flanges anchored with sidewall beads of the tire, and one of said flanges having an exposed inner diameter,
   and depressor means comprised of a second class lever with its fulcrum end at one side of the tank, its power end at the other side of the tank, and having a pair of upwardly and outwardly divergent equalizing sections engageable with diametrically opposite points upon the inner diameter of said one wheel flange intermediate its ends to simultaneously level and center and depress the wheel mount in a submerged and quieted condition.

2. The submersion tank for testing wheel mounted vehicle tires as set forth in claim 1, wherein the equalizing sections are divergent at an included angle of substantially 90°.

3. The submersion tank for testing wheel mounted vehicle tires as set forth in claim 1, wherein the equalizing sections of the lever are joined by an intermediate section offest from aligned fulcrum and power sections.

4. The submersion tank for testing wheel mounted vehicle tires as set forth in claim 3, wherein the intermediate section of the lever carries a ring offset therewith to engage with and horizontally stabilize the wheel mount.

5. The submersion tank for testing wheel mounted vehicle tires as set forth in claim 3, wherein the intermediate section of the lever carries a ring engageable concentrically within the wheel mount to horizontally stabilize and center the same.

6. The submersion tank for testing wheel mounted vehicle tires as set forth in claim 1, wherein the equalizing sections of the lever are joined by an intermediate section at points of joinder within the flange diameter of the smallest wheel rim diameter to be engaged.

7. The submersion tank for testing wheel mounted vehicle tires as set forth in claim 1, wherein the equalizing sections of the lever are joined to aligned fulcrum and power end sections at points of joinder outside the flange diameter of the largest rim diameter to be engaged.

8. The submersion tank for testing wheel mounted vehicle tires as set forth in claim 1, wherein the equalizing sections of the lever are joined by an intermediate section at points of joinder within the flange diameter of the smallest wheel rim diameter to be engaged, and wherein the equalizing sections of the lever are also joined to aligned fulcrum and power end sections at points of joinder outside the flange diameter of the largest rim diameter to be engaged.

9. The submersion tank for testing wheel mounted vehicle tires as set forth in claim 1, wherein the power end of the lever has a grip for manipulation and a releasable latch means for securement to the side of the tank.

10. The submersion tank for testing wheel mounted vehicle tires as set forth in claim 1 wherein the equalizing sections are divergent at an included angle of substantially 90°, and wherein the power end of the lever has a grip for manipulation and a releasable latch means for securement to the side of the tank.

11. The submersion tank for testing wheel mounted vehicle tires as set forth in claim 1 wherein the equalizing sections of the lever are joined by an intermediate section offset from aligned fulcrum and power sections, and wherein the power end of the lever has a grip for manipulation and a releasable latch means for securement to the side of the tank.

12. The submersion tank for testing wheel mounted vehicle tires as set forth in claim 1 wherein the equalizing sections of the lever are joined by an intermediate section at points of joinder within the flange diameter of the smallest wheel rim diameter to be engaged, and wherein the power end of the lever has a grip for manipulation and a releasable latch means for securement to the side of the tank.

13. The submersion tank for testing wheel mounted vehicle tires as set forth in claim 1 wherein the equalizing sections of the lever are joined to aligned fulcrum and power end sections at points of joinder outside the flange diameter of the largest rim diameter to be engaged, and wherein the power end of the lever has a grip for manipulation and a releasable latch means for securement to the side of the tank.

14. The submersion tank for testing wheel mounted vehicle tires as set forth in claim 1 wherein the equalizing sections of the lever are joined by an intermediate section at points of joinder with the flange diameter of the smallest wheel rim diameter to be engaged, wherein the equalizing sections of the lever are also joined to aligned fulcrum and power sections at points of joinder outside the flange diameter of the largest rim diameter to be engaged, and wherein the power end of the lever has a grip for manipulation and a releasable latch means for securement to the side of the tank.

* * * * *